Sept. 20, 1932.  M. L. SMITH  1,878,004

RECORDING APPARATUS

Filed Dec. 13, 1930  2 Sheets-Sheet 1

Inventor:
Merle L. Smith,
By Byrnes Townsend & Potter,
Attorneys.

Sept. 20, 1932.  M. L. SMITH  1,878,004
RECORDING APPARATUS
Filed Dec. 13, 1930  2 Sheets-Sheet 2
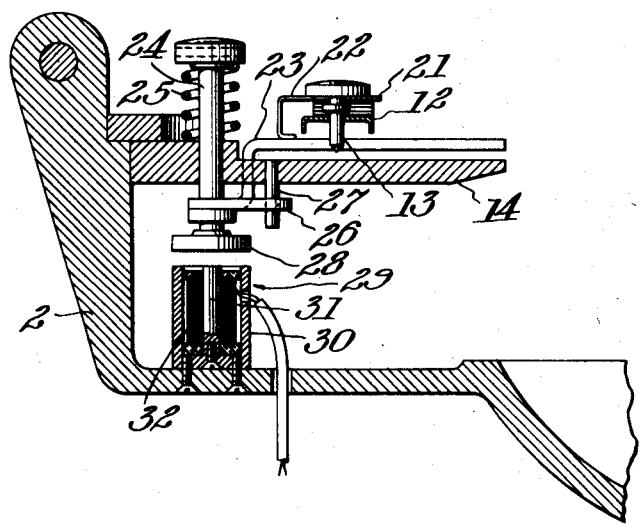
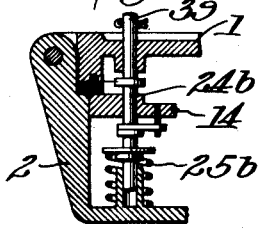
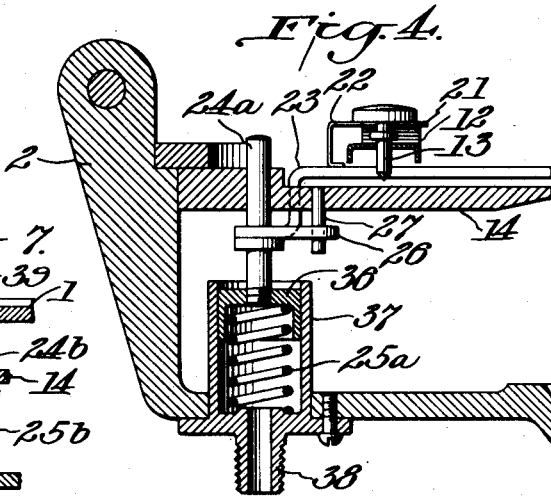
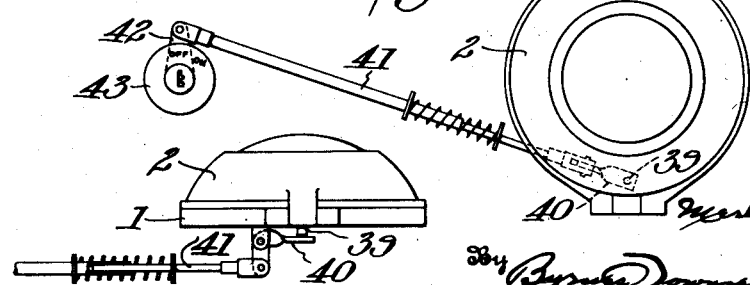

Patented Sept. 20, 1932

1,878,004

UNITED STATES PATENT OFFICE

MERLE L. SMITH, OF UPPER DARBY, PENNSYLVANIA, ASSIGNOR TO THE ELECTRIC TACHOMETER CORPORATION, OF PHILADELPHIA, PENNSYLVANIA, A CORPORATION OF DELAWARE

RECORDING APPARATUS

Application filed December 13, 1930. Serial No. 502,229.

This invention relates to recording apparatus and particularly to apparatus for recording the occurrence and duration of the periods of travel of a self-propelled vehicle and the periods of idle running of the vehicle motor.

The invention is particularly, but not exclusively, adapted for use on a recorder of the type disclosed in the copending application of Fritz Manthey, Serial No. 368,140, filed June 3, 1929, wherein a pendulum, actuated by the vibratory motion of a vehicle on which the recorder is installed, moves a stylus in a reciprocating path to trace a zigzag line on a record sheet which is moved past the stylus at a constant speed in a direction transverse to the direction of movement of the stylus.

In prior devices of this general type, the only record made by the recorder is a record of the occurrence and duration of the periods of travel of the vehicle and no provision is made for recording the periods of idle running of the motor. It frequently is equally as important to the owner of the vehicle to be informed of the periods of idle running of the vehicle motor as to be informed of the periods of travel of the vehicle since much of the expense of operating a vehicle is incurred by the idle running of the motor.

One of the principal objects of the present invention is the provision of a recorder which will accurately record the occurrence and duration of the periods of idle running of a vehicle motor as well as the occurrence and duration of the periods of travel of the vehicle.

Another object of the invention is to provide a recorder which is simple and rugged in construction and at the same time accurate and reliable in operation.

Another object of the invention is the provision of a recorder for vehicles which is active upon the energization of a vehicle motor to record the periods of operation of the motor and which is actuated by the vibratory motion of the vehicle for indicating the travel of the same.

Other objects of the invention will appear from the following description taken in connection with the appended drawings, wherein:

Fig. 3 is a fragmentary sectional view showing the mechanism for raising and lowering the stylus, Figs. 4 and 5 are views similar to Fig. 3, showing two modified forms of the invention, Fig. 6 is another view of Fig. 5, Fig. 7 is a detail of the modification shown in Figs. 5 and 6.

Figure 1:
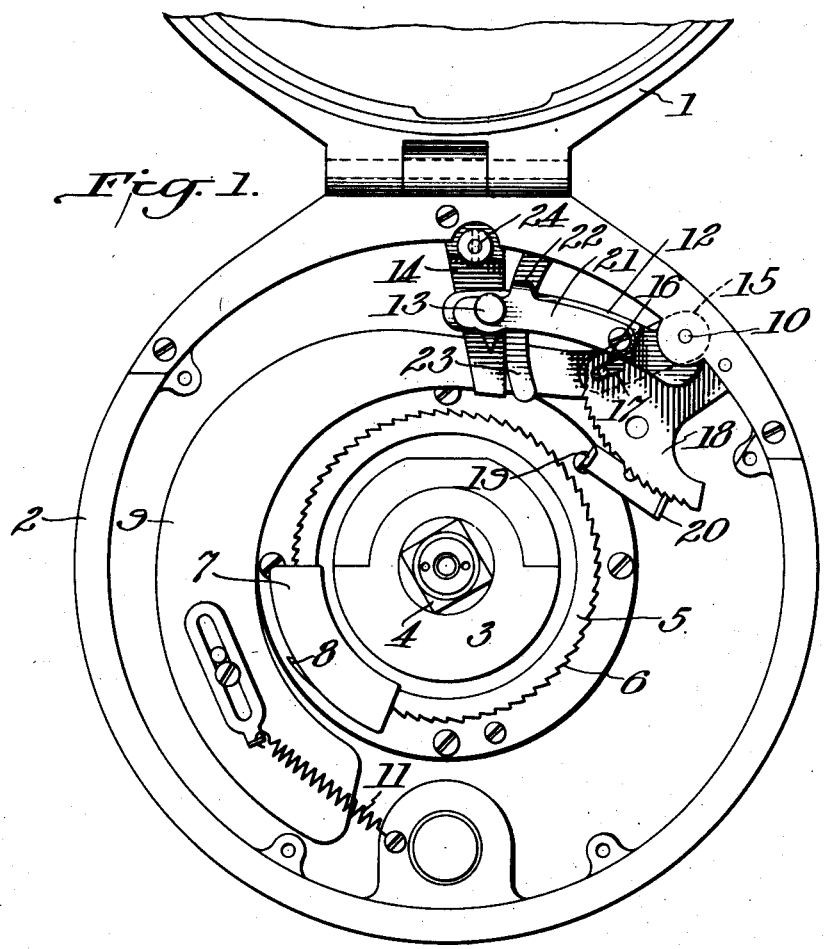
Fig. 1 is a plan view showing the recorder with the casing open.

Hinged to a circular mounting member 1 is a bowl shaped cover 2, in the central portion of which is disposed a clock-work mechanism 3 from which projects a spindle 4 carrying a disk 5 having ratchet teeth 6 formed on its periphery. Slidably mounted on the edge of the disk 5 is a cam support 7 carrying a cam 8 having an integral pawl portion (not shown) cooperating with the ratchet teeth whereby the cam support 7 is free to move in one direction independently of the disk 5 but is prevented by the pawl 8 from moving in the opposite direction.

Closely surrounding the clock-work mechanism 3 is a semi-circular pendulum 9, one end of which is pivoted to the cover 2 by a pin 10, and the other end of which is yieldably positioned by a spring 11 connected to the cover 2. Mounted on the pivot 10 and having a frictional connection with the pendulum 9, is an arm 12 carrying a stylus 13 at its free end, which stylus cooperates with a table or record support 14 extending inwardly from the edge of the cover 2.

Rigidly connected to the stylus arm 12 is a lever 15 having an upstanding pin 16 extending into a slot 17 formed in a segmental ratchet member 18 pivoted to the cover 2 with its toothed portion disposed opposite the teeth 6 on the disk 5. The position of the ratchet member 18 determines in general the position of the stylus arm 12 but the slot 17 is of such width that the pin 16 can move slightly in a direction transversely of the slot 17, thus permitting a slight movement of the stylus arm 12 independently of the ratchet member 18.

The ratchet member 18 is normally urged in counter-clockwise direction (as viewed in Fig. 1) by a spring (not shown) and is retained in one of several positions by a pair of integrally connected pawls 19, 20 pivotally mounted in the space between the ratchets 6 and 18. One of the pawls 19 is disposed in the path of the cam and is depressed by the cam 8 as it moves past the pawl 19 to move the other pawl 20 out of engagement with the segmental ratchet 18, whereby the ratchet 18 is permitted to advance one step. Thus the segmental ratchet 18 moves forward one step upon the completion of each revolution of the cam 8. The movement of the segmental ratchet 18 is transmitted to the stylus arm 12 through the agency of the pin 16 and lever 17 and the stylus 13 is thereby moved inwardly each time the cam 8 is rotated past the pawl 19.

Referring to Fig. 3, a leaf spring 21 secured at one end to the top surface of the stylus arm 12 and extending in the same direction, engages the shank of the stylus 13 and tends to depress the stylus 13 which extends through the end of the stylus arm 12. The free end 22 of the spring 21 is bent around the stylus arm and rests upon an inwardly projecting arm 23 carried on a plunger 24 which extends through the table 14 and which is urged upwardly by a spring 25 surrounding its upper end. The arm 23 is provided with a perforated portion 26 engaging a pin 27 secured in the table 14 for the purpose of guiding the plunger 24.

Secured to the lower end of the plunger 24, is a circular armature 28 below which is disposed a cylindrical electric magnet 29, comprising a casing 30 secured to the cover 2, a pole member 31 and a solenoid 32. The solenoid 32 is electrically connected to the ignition system (not shown) of the vehicle on which the recorder is installed. Instead of being connected to the ignition system, the solenoid may be supplied with current from the vehicle battery through a separate circuit controlled by a switch operated by the movement of the ignition switch or by the movement of any of the movable elements of the vehicle motor, whereby the solenoid is energized when the vehicle motor is operated.

Figure 2:
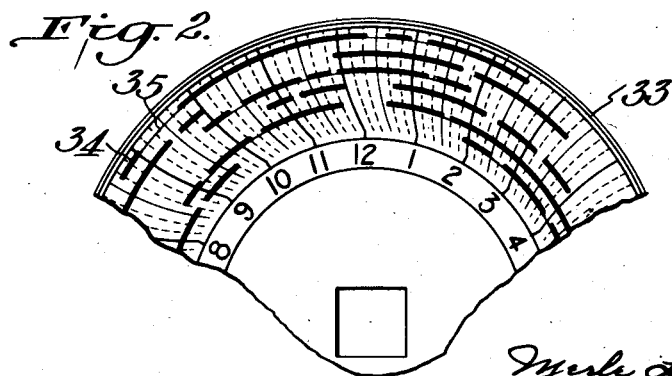
Fig. 2 is a view showing a portion of the record sheet with a typical record marked thereon.

A record sheet used for making the record is shown in Fig. 2. The record sheet comprises a circular sheet of paper having a specially prepared surface which surface is scraped off by the point of a stylus moving across the sheet to vividly display the path taken by the stylus. Marked on the sheet is a series of time lines representing hours and fractions thereof, which lies are so spaced that when the record sheet is placed on the spindle and rotated past the stylus by the clock-work mechanism, the length of the sheet which travels past the stylus in one hour equals the distance between two successive hour marks. The time lines extend in generally radial directions but each has a curvature which corresponds to the path traced by the stylus as the stylus arm rotates about its pivot.

The operation of the device is as follows:

The recorder is mounted on a vehicle by means of the mounting member 1, in such a position that the pendulum 9 extends diagonally upward from its pivot 10, a line from the pivot 10 to the end of the pendulum 9 making an angle of approximately 45° with the vertical. The clock-work mechanism 3 is wound and the cam 8 rotated manually in counter-clockwise direction to a position immediately beyond the pawl 19, the stylus arm being rotated into its outermost position (as shown in full lines in Fig. 1). A record sheet is placed on the spindle 4 with its outer portion resting on the table 14 which serves to support the record sheet and the spindle 4 is rotated manually until that time line on the record sheet which corresponds to the time of starting the recorder lies under the stylus 13. Since the spindle 4 is driven by the clock-work mechanism 3, it begins to rotate as soon as the clock-work mechanism 3 is wound and hence the record sheet begins to rotate. The disk 5 is also rotated by the spindle 4 and carries with it the cam support 7.

When the ignition switch (not shown) is turned to the "on" position the solenoid 32 is energized, thereby to attract the armature 28 and the plunger 24 against the force of the spring 25. The plunger 24 depresses the arm 23 which releases the leaf spring 21 to permit the latter to move the stylus 13 into contact with the table 14 on which the record element is supported. The stylus 13 thus traces on the record sheet a narrow line which indicates that the motor has been running and that the vehicle is standing still during the period shown by the time lines intersected by the narrow line.

When the vehicle is set in motion, the vibration resulting from the movement of the vehicle causes the pendulum 9 to oscillate about its pivot 10. The movement of the pendulum 9 is transmitted to the stylus arm 12 through the friction connection, the friction of which is greater than the friction of the stylus 13 bearing against the record sheet, and the stylus thus traces a zigzag line upon the record sheet. The peripheral speed of the record sheet past the stylus 13 is so low that consecutive portions of the zigzag line traced by the stylus 13 touch one another to constitute a solid band having a width equal to the throw of the stylus 13, which band indicates that the vehicle has been travelling during the time shown by the time lines intersected by the wide band.

When the vehicle is stopped, the pendulum 9 ceases to vibrate and the stylus 13 remains stationary. The clock-work mechanism 3 continues to rotate the record element on which a thin line is traced as long as the vehicle motor is permitted to run. When the vehicle motor is stopped, the solenoid 32 is deenergized and the spring 25 raises the plunger 24 which pushes the arm 23 against the bent portion 22 of the leaf spring 21 to raise the stylus 13 from the table 14. The clock-work 4 continues to rotate the record element but no mark is traced thereon, which circumstance indicates that the vehicle has been standing still and the motor shut off during the time shown.

When the cam 8 is carried around one complete revolution, it depresses the pawl 19 to release the segmental ratchet member 18 which is moved forward one step by its spring (not shown) and carries with it the stylus arm 12. The stylus 13 is thus moved inwardly along the time line on which it was started and thereafter traces a second circle concentric with the first circle.

This operation is repeated preferably seven times which permits the use of a record sheet of sufficient size to bear a record of one week of operation, each concentric circle representing the operation for one day.

In Fig. 2 is shown a record sheet 33 with a typical record traced thereon. The operation of the vehicle for the first day is shown by the outer circle. The vehicle was started at 8:38 and was operated as shown by the wide band 34, until 9:01. At 9:01 the vehicle was stopped and the motor left running idle, as shown by the narrow line 35 until 9:47. The vehicle was then operated until 2:32 with halts from 12:23 to 12:32 and from 12:58 to 1:11, during which halts the motor was left running idle. At 2:32 the vehicle was stopped and the motor shut off (as shown by the fact that no line appears after 2:32).

The circle immediately within the outer circle shows the operation for the second day. On this day, the vehicle was operated from some time prior to 8 o'clock until 3:22 at which time the vehicle was stopped and the motor shut off. The vehicle was halted from 9:23 until 9:35, from 10 o'clock until 11:55 and from 1:41 until 1:52, during which halts the motor was shut off. The other circles may be interpreted in a similar manner.

In Fig. 4 is shown a modified form of the mechanism for raising and lowering the stylus arm. In this form, the plunger 24a carries a piston 36 slidable in a cylinder 37 mounted in the wall of the cover 2, and is urged upwardly by the spring 25a which is disposed in the cylinder 37 and bears against the lower wall of the piston 36. Formed integrally with the cylinder 37, is a nipple 38 to which is connected a conduit (not shown) leading to the intake manifold, or vacuum tank (not shown) of the vehicle.

When the motor is operated, the vacuum produced in the intake manifold draws the air out of the cylinder 37 whereby the piston 36 is depressed against the force of the spring 25a and carries with it the plunger 24a. The plunger 24a depresses the arm 23 which action releases the leaf spring 21 to permit it to lower the stylus 13 into contact with the table 14. When the motor is shut off, air enters the cylinder 37 and the spring 25a raises the piston 36. The plunger 24a is thus lifted and raises the arm 22 which pushes up the leaf spring 21 to raise the stylus 13 out of contact with the table 14.

In Fig. 5 is shown another modified form of the stylus elevating and depressing mechanism. In this form, the plunger 24b bears against a second plunger 39 which extends through the mounting plate 1. The end of the plunger 39 which projects from the plate 1 cooperates with a crank 40 connected by a link mechanism 41 to the movable portion 42 of an ignition switch 43.

The plunger 39 is normally urged out of the casing by the coil spring 25b and thus the stylus (not shown) is normally held out of contact with the table 14. When the movable portion 42 of the ignition switch 43 is moved to the "on" position, the crank 40 pushes the plunger 39 into the casing to depress the stylus (not shown) into contact with the table 14. Thus it will be seen that when the ignition switch 43 is in the "on" position, the stylus cooperates with the record sheet to trace a record thereon, but when the ignition switch 43 is in the "off" position, the stylus is held out of contact with the record sheet.

In regard to the record sheet and stylus, it should be noted that the reference to a sheet of paper having a specially prepared surface and a stylus, is merely for the purpose of illustration and that the invention is not limited to the use of such elements. It will be obvious that any other type of writing element such as a pen or pencil and any other type of record element such as slate or metal plate, may be used. Where the terms "stylus" and "record element" are used in the following claims, these terms are to be taken as meaning any type of marking means and any type of means for receiving the mark.

Where a record element having sufficient rigidity is employed, it is possible to dispense with the table which normally supports the peripheral portion of the record element.

The invention is not limited to use with the particular type of recorder here shown but has application on any type of recorder where it is desirable that a record be traced where certain conditions obtain and that where other conditions obtain to have the stylus held out of contact with the record element.

I claim:

1. The combination with a vehicle having a motor, of means controlled by said motor for recording the occurrence and duration of the periods of energization of said motor and vibratory means additonal to said motor controlled means and controlled by the travel of said vehicle for recording the occurrence and duration of the periods of travel of said vehicle.

2. In apparatus for recording the operation of a motor vehicle, the combination with a record element and a stylus, of means for effecting continuous relative movement between said record element and stylus, means normally maintaining said record element and stylus out of contact, means active upon the energization of the vehicle motor for maintaining said record element and stylus in contact, and means actuated by the movement of said vehicle for effecting relative movement between said record element and stylus, said second movement having a characteristic different from the movement effected by said first mentioned means.

3. In apparatus for recording the movement of a motor vehicle, the combination with a stylus, means actuated by the movement of said vehicle for moving said stylus, a record element and means for moving said record element past said stylus, of means normally maintaining said stylus out of contact with said record element and means active upon the energization of the motor of said vehicle for moving said stylus into contact with said record element and for maintaining said contact during the energization of said motor.

4. A recorder of the vibrating type comprising a casing, a table therein, an arm pivoted adjacent said table, a stylus carried by said arm and movably mounted in said arm for movement into contact with said table, a spring tending to move said stylus into contact with said table, a spring pressed member bearing against said first spring for normally maintaining said stylus out of contact with said table, vibratory means for actuating said stylus and an electromagnet armature carried on said spring pressed member.

5. A recorder of the vibrating type comprising a casing, a table therein, a stylus, vibratory means for actuating said stylus, an arm supporting said stylus adjacent said table, means tending to move said stylus into contact with said table, means extending through said table for normally rendering said first means inoperative, and an electromagnet mounted under said table for controlling said second means.

6. In a recorder for recording the operating periods of a motor operated device, the combination with a record sheet, means for moving said record sheet, a stylus and means actuated by the movement of said motor-operated device, for moving said stylus over said record sheet, of means for moving said stylus out of engagement with said record sheet, and means actuated by energization of the motor which operates said device for moving said stylus into engagement with said sheet.

7. The combination with a motor vehicle, of a record element, an arm, a stylus movably mounted in said arm, means normally maintaining said stylus out of contact with said record element, means for continuously moving said record element past said stylus, means operative upon the energization of the motor of said vehicle for moving said stylus in said arm and into operative contact with said record element, and means actuated by the movement of said vehicle for imparting to said arm a movement transverse to the movement of said record element.

8. The combination with a motor vehicle, of a record element, a stylus, means for continuously moving said record element past said stylus, means normally maintaining said stylus out of contact with said record element, means including a portion of the motor of said vehicle and active upon the energization of said motor for maintaining said stylus in operative contact with said record element to trace a line thereon corresponding to the direction of movement of said record element, and means including a freely swinging member active upon the movement of said vehicle for vibrating said stylus to trace upon said record element a line oscillating transversely with respect to the direction of movement of the record element.

9. A recorder of the vibratory type comprising, a casing, a table, an arm disposed adjacent said table, means mounting said arm for movement only in a plane passing parallel to said table, a stylus mounted in said arm, vibratory means for actuating said stylus, means normally maintaining said table and said stylus in spaced relation and means for moving said stylus and said table relatively to one another and perpendicularly to said plane into operative contact.

10. The combination with a motor vehicle carrying an electric circuit thereon, of vibration actuated means for recording the occurrence and duration of the periods of use of said vehicle, said means including a record element, a stylus normally held out of contact with said record element, means for vibrating said stylus and means including an electromagnet connected in said electric circuit for maintaining said stylus in operative contact with said record element when said electric circuit is energized.

In testimony whereof, I affix my signature.

MERLE L. SMITH.